(12) United States Patent
Gunnarsson et al.

(10) Patent No.: US 8,114,371 B2
(45) Date of Patent: Feb. 14, 2012

(54) PROCESS FOR PRODUCTION OF PRECIPITATED SILICA FROM OLIVINE

(75) Inventors: Gudmundur Gunnarsson, Reykjavik (IS); Oddmund Wallevik, Skien (NO); Lars Øyvind Ekornrød, Skien (NO); Birger Langseth, Porsgrunn (NO); Per Bjøm Engseth, Porsgrunn (NO)

(73) Assignee: COD Technologies, a.s., Porsgrunn (NO)

( * ) Notice: Subject to any disclaimer, the term of this patent is extended or adjusted under 35 U.S.C. 154(b) by 1561 days.

(21) Appl. No.: 10/585,475

(22) PCT Filed: Jan. 13, 2005

(86) PCT No.: PCT/NO2005/000017
§ 371 (c)(1),
(2), (4) Date: Sep. 6, 2006

(87) PCT Pub. No.: WO2005/068363
PCT Pub. Date: Jul. 28, 2005

(65) Prior Publication Data
US 2009/0263657 A1 Oct. 22, 2009

(30) Foreign Application Priority Data
Jan. 14, 2004 (NO) .................................. 20040167

(51) Int. Cl.
*C01B 33/12* (2006.01)
*C01B 33/148* (2006.01)
*C01B 33/158* (2006.01)

(52) U.S. Cl. ..................... 423/335; 423/340; 423/658.5

(58) Field of Classification Search .................. 423/335, 423/340, 594.2, 658.5
See application file for complete search history.

(56) References Cited

U.S. PATENT DOCUMENTS

| 4,537,699 | A | * | 8/1985 | Jas ..................................... 516/81 |
| 5,484,581 | A | * | 1/1996 | Esch et al. ..................... 423/335 |
| 5,780,005 | A | | 7/1998 | Olerud |
| 5,800,608 | A | * | 9/1998 | Bomal et al. ................... 106/492 |
| 5,846,311 | A | * | 12/1998 | Bomal et al. ................... 106/492 |
| 5,876,494 | A | * | 3/1999 | Bomal et al. ................... 106/492 |
| 6,107,226 | A | * | 8/2000 | Chevallier ..................... 501/133 |
| 6,702,888 | B2 | * | 3/2004 | Bomal et al. ................... 106/492 |
| 7,524,478 | B2 | * | 4/2009 | Valero et al. ................... 423/335 |
| 2001/0051176 | A1 | | 12/2001 | Viot |
| 2003/0066459 | A1 | | 4/2003 | Bomal et al. |
| 2006/0051279 | A1 | * | 3/2006 | Gunnarsson ................... 423/339 |

FOREIGN PATENT DOCUMENTS
WO 02/48036 6/2002
WO WO 2004/048264 * 6/2004
* cited by examiner

*Primary Examiner* — Hoa (Holly) Le
(74) *Attorney, Agent, or Firm* — Wenderoth, Lind & Ponack, L.L.P.

(57) ABSTRACT

Process for the production of precipitated silica from olivine including the following steps:
  providing olivine particles with a particle size preferably below 1 mm in diameter,
  preferably mixing olivine and water to form an olivine/water slurry,
  mixing the olivine/water slurry with hydrochloric acid (HCl), preferably at a Concentration at 18 wt % or above, and at a temperature preferably between 50 -130° C., and reacting for a period of time, preferably between 20-360 minutes,
  removal of coarse mineral impurities (sand product),
  separation of precipitated silica from mother solution,
  mechanical treatment of the separated precipitated silica and optionally some water to obtain a slurry,
  preparation of a low viscosity slurry by adding sodium aluminate or another suitable aluminate, preferably to 100-6000 p.p.m., and adjusting the pH, preferably to values between 4-9
  ageing at a temperature between 50-150° C. according to product requirements
  dispersion of silica slurry
  removal of fine mineral impurities (sand product)
  drying of the silica.

21 Claims, 3 Drawing Sheets

PROCESS FOR PRODUCTION OF PRECIPITATED SILICA FROM OLIVINE

The invention concerns a process for the production of silica from olivine. In particular it concerns a process for the dissolution of olivine in hydrochloric acid, which gives silica that is further processed to give high purity silica of controlled structure, in powder, bead or granule form.

Olivine is a natural magnesium iron silicate available in large quantities at many locations in the world. The chemical composition of olivine is typically about 50% magnesia, about 41% silica and about 7-9% iron oxide. The mineralogical composition of olivine is a mix of forsterite (magnesium silicate) and fayalite (iron silicate). Olivine is easily soluble in acid and it has been considered as a raw material for magnesium chemicals and silica.

Fine grained silica, e.g. produced by precipitation, is commonly used as filler material for different applications. For some applications of silica, as for example in tire rubber, the so called CTAB (cetyl trimethyl ammonium bromide) specific surface area is of importance. The CTAB specific surface area is obtained by measuring the quantity of CTAB adsorbed on the surface of the silica, from an aqueous solution under specific conditions, as for example described in French standard NFT45-007. Some laboratories use variations of methods described in NFT 45-007, but most of them assume that one adsorbed CTAB molecule covers 0.35 $nm^2$. The CTAB specific surface area is believed to give a measure of the silica surface area available for bonding to rubber. The BET specific surface area on the other hand gives a measure of the silica surface area that is available for nitrogen, a molecule that is much smaller than CTAB. The ratio of CTAB specific surface area to BET specific surface area (the CTAB/BET ratio) is therefore always smaller than 1 for silica. For applications in rubber, and especially in green tire rubber formulations, it is beneficial to have the CTAB/BET ratio larger than 0.9, or as close to 1 as possible, and to have a BET specific surface area in the range of about 130-230 $m^2/g$. The BET specific surface area of silica obtained by dissolution of olivine in acid can be in the range from below 100 $m^2/g$ to above 500 $m^2/g$ depending on the particle size of the olivine and other parameters. A description of the BET method for measuring the specific surface area can be found in international standard ISO 9277: 1955.

U.S. Pat. No. 5,780,005 describes a process for production of silica from olivine. It discloses a process including pre-treatment of the olivine in order to remove from it most of the accessory minerals that might otherwise contaminate precipitated silica obtained when olivine is dissolved in hydrochloric acid. The process also includes features for controlling the specific surface area of the produced silica. It is demonstrated that acid strength, temperature, and leaching time all have an effect on the specific surface area of the silica. As this known process is dealing with pre-treated olivine it is economically expensive and it does not take into account the CTAB specific surface area of the silica obtained.

Another process for the production of active silica from natural silicates is described in GB patent application No. 2 078703 A. The process focuses on the production of silica from serpentine, a magnesium iron silicate related to olivine, and the content of impurities in the silica obtained is relatively high.

Further, international patent application, WO02/48036 A1 describes a process for the production of silica from olivine. This process is based on the sulfatisation of olivine with concentrated sulfuric acid at approx. 250° C., followed by leaching in water to give precipitated silica, which is then subjected to further purification steps. A disadvantage with this method is that it gives impure silica.

Still further, a process for producing from olivine precipitated silica with controlled specific surface area and high degree of purity is described in Icelandic patent application No. 6635. The process comprises mixing in a controlled manner olivine and a heated mineral acid solution and thereafter separating most of the un-dissolved olivine and accessory minerals. The silica slurry is then filtered to recover the metal salt solution and the silica washed to remove dissolved salt from the silica. The washed silica filter cake is then slurried in aqueous solution to obtain a low viscosity high solid content silica slurry from which insoluble mineral can be efficiently separated (i.e. the silica slurry can be efficiently degritted) and dried with a relatively low energy consumption. The obtained silica can be in powder, bead or granule form and preferably has a specific surface area of at least about 100 $m^2/g$. The CTAB specific surface area of the silica is not at all mentioned.

The acidic metal salt solution is separated from the precipitated silica, and can be further purified for production of pure magnesium chlorine brine, which can be used for production of magnesium metal, magnesium oxide and other magnesium chemicals. This which will be further described in a paralell application.

The main object with the present invention is to provide a process for the efficient utilisation of olivine, with minimum production of waste, and in which high value silica, is obtained as product.

It is further an object with the present invention to provide a process for production of silica with controlled properties.

The invention is characterized by the following steps:
providing olivine particles with a particle size preferably below 1 mm in diameter,
preferably adding of water to form a water slurry,
mixing with hydrochloric acid (HCl), preferably at a concentration above 18 wt % and at a temperature preferably between 50-130° C., for a period of time, preferably between 20-360 minutes,
removal of coarse mineral impurities,
separation of precipitated silica from mother solution,
mechanical treatment of the silica to obtain a slurry,
preparation of a low viscosity slurry by further adding to the silica sodium aluminate or another suitable aluminate and optionally some acid and water, preferably so that the concentration of Al in the silica is 100-6000 p.p.m.,
ageing the silica at a temperature between 50-100° C. according to product requirements,
dispersion of silica slurry,
removal of fine mineral impurities, and
drying of the silica.

The invention is further characterized by a silica product including in addition to silica ($SiO_2$); 0.005 0.7 wt % Na, 0.0035 0.35 wt % Al, 0.02 0.05 wt % Mg, 0.002 0.006 wt % Ca, 0.001 0.2 wt % S, 0.007 0.06 wt % Fe, up to 0.01 wt % Cl, 1-10 wt % $H_2O$, and with a pH between 4-9.

The invention will be further described in the following by means of examples and with reference to the attached figures, where:

For the process of the present invention the olivine particles should have a suitable particle size, which is less than about 1 mm in diameter, and preferably less than about 0.750 mm in diameter, and more preferably less than about 0.500 mm in diameter, and preferably in the range of about 0.020-0.400 mm in diameter, and more preferably less than about 0.350 mm. Suitable olivine may be obtained from various sources in the world, e.g. in Norway, Greenland and North-America. Raw olivine mineral may be ground substantially to the suitable size with conventional methods, such as by wet milling or milling in a cone crusher and/or disk mill. The material may optionally be fractioned to obtain a more homogeneous size distribution.

The preferred raw olivine should contain more than 90% of mineral forsterite.

The olivine is normally not purified before added to the hydrochloric acid in the reactor.

The manner in which olivine is dissolved in mineral acid is a key factor in controlling the specific surface area of the produced silica. The inventors have tested and compared several embodiments for dissolving the olivine in mineral acid in a controlled manner. The phrase "dissolving in a controlled manner" means in this context to control and keep within suitable limits at least parameters including acid concentration, leaching temperature, and period of time for which the olivine is leached in the acid. Preferably the rate at which olivine is added to the acid solution is controlled, as well as the temperature of the acid at the time of addition.

Figure 1:
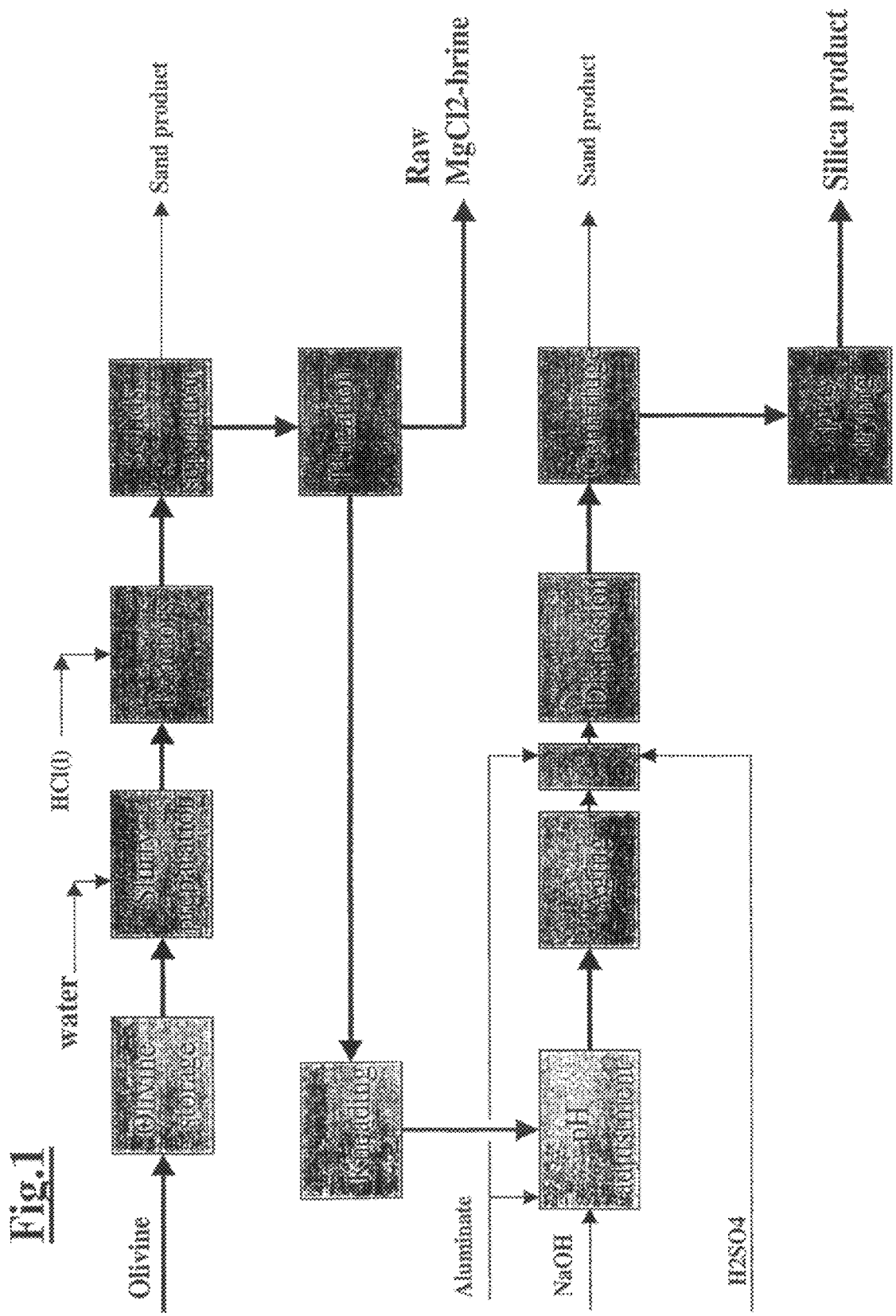
FIG. 1 shows a flow-sheet of the invention.

Referring to the flow sheet, FIG. 1, olivine is transported from a storage 1 to a suitable mixer 2, being mixed with added water to obtain a suspension containing preferably in the order of 70% olivine. The water used to make the slurry can be at any temperature up to 100° C. It is also possible to heat the slurry after mixing. The process as shown in the flow sheet, is a batch type process, but the invention as defined in the claims may as well be adapted to a continuous type which will not be further described.

From the mixer 2 the suspension is transferred to a reactor 3 to which hydrochloric acid (HCl) has been added. The temperature of the acid solution should preferably be in the range of about 50-110° C., when the addition of olivine is started, preferably in the range of about 80-110° C. or most preferably in the range of about 90-105° C., and the temperature of the olivine/acid slurry should be in the range of 80-110° C. after mixing. The time for adding olivine slurry to the hydrochloric acid should preferably be between 0.5 and 5 minutes. The dissolution of olivine in acid is exothermic which will result in a temperature increase of the reaction mixture, unless very efficient cooling is employed. The rate of temperature increase is dependent on several factors, as for example the grain size of the olivine used, the concentration of the acid and the ratio of olivine to acid. When hydrochloric acid of about 19-22 wt % HCl concentration is used we have found that the temperature can increase to the boiling point of the acid, 109-110° C. (in reactors operated at ambient pressure). Reactors operating under pressure and higher temperature can also be used. The total reaction time is preferably in the range of 0.2-6 hours, and more preferably in the range of 0.5-2 hours.

An alternative to mixing the slurry with all the hydrochloric acid, as described above, is to mix the olivine/water slurry with a quantity of dilute hydrochloric acid that does not contain all the HCl aimed for and add the remaining acid during the reaction using higher concentrated acid. It is for example possible to add the olivine/water slurry to 18% hydrochloric acid and then add 30-36% hydrochloric acid over a period of 3-30 minutes until the desired ratio of olivine to acid is reached.

By dissolving the olivine in a controlled manner as described above and adjusting the parameters as described, silica may be obtained with a specific surface area measured according to the BET method in the range of about 50-500 $m^2/g$.

After the olivine-silica slurry has been heated for the desired period of time, un-dissolved olivine and other mineral impurities (sand product) are removed from the slurry in a suitable separator 4. This may be readily accomplished by allowing the coarse grained impurities to sediment from the bulk of the silica slurry. The bulk of the slurry liquid can then be separated from the sediment, e.g. by suctioning or decanting. Long sedimentation time will results in more loss of silica, since part of the silica will also sediment together with the mineral impurities. Alternatively, a hydrocyclone of suitable dimensions can be used for this purpose, or other conventional equipment suitable for separation of coarse particle material from finer particles. Most of the coarse grained mineral impurities, consisting of un dissolved olivine and insoluble minerals, are separated in this way from the bulk of the silica. However, fine-grained mineral impurities are not separated effectively from the bulk of the silica in this way.

The silica is then removed from the slurry in a filtration stage 5. The formed silica filter cake is washed with aqueous washing liquid (typically water) until suitably pure. The washed silica filter cake will typically have a solid content in the range of 20-30 wt %, depending on the type of filter used and on the properties of the silica. A rather high viscosity slurry is then prepared in step 6 in a suitable device (or devises) from the silica filter cake, The resulting slurry has a high content of solid material, preferably in the range of about 10-30%, and more preferably the range of about 18-22%. Many different methods can be used to prepare the high viscosity slurry, depending among other things on the solid content of the silica filter cake. In some cases (especially when no water needs to be added) it may be sufficient to subject the filter cake to intense mechanical treatment, as for example in a kneader to obtain a thick paste. The thick paste can then be treated with a mechanical stirrer to obtain slurry, yet of relatively high viscosity. When the silica filter cake is of high solid content (e.g. 22-30%) it may be necessary to add water in order to obtain stirrable (rather high viscosity) slurry. In this case the silica filter cake can be added under intense mechanical stirring to water until a slurry of the desired solid content is obtained. Other methods evident to persons skilled in the art can also be used to prepare slurry from the silica filter cake. It will be highly appreciated that the present invention provides means to obtain low viscosity slurry with a high content of solid material. This is preferably achieved by adding sodium aluminate to the high viscosity silica slurry in a further step 7, preferably in a concentration range of about 100-6000 ppm Al in silica, or more preferably, Al concentration in the range of 300-3500 ppm. at a pH in the range of 4-9.

Acid, for example sulfuric acid or hydrochloric acid may simultaneously, in the same step 7, be added for pH adjustment. It is even possible to use acids like formic acid, acetic acid and others and thus obtain sulfate free silica low in chloride content. Even phosphoric acid can be used. The pH is preferably in the range of 4-9, but more preferably 5-8.

It is also possible to combine steps 6 and 7 and prepare low viscosity slurry from the silica filter cake in one step.

Many different techniques can be used for the preparation of low viscosity silica slurry from silica filter cake, or high viscosity silica slurry, and sodium aluminate (where acid is optionally used for pH adjustment). These include dispersers of various types, such as ultrasonic dispersers, and high shear mixers. The preparation of the silica slurry can be carried out in several steps as for example by first mixing the silica filter cake and chemicals, and then subjecting the slurry to a dispersing step. Some water may have to be added, as mentioned before, depending on the solid content of the filter cake after filtration.

The quantity of sodium aluminate added will depend on the intended use of the silica and on further steps needed to obtain silica with the desired properties. In many cases the silica slurry may be degritted when the proper quantity of alumina has been added, where after the silica will be dried, as described in Icelandic patent application 6635. In other cases as for example, when the rubber grade silica is the desired product the silica will have to be processed further to adjust the CTAB/BET ratio to the required value. The inventors have revealed that the CTAB/BET ratio can be increased to above 0.9 by ageing the silica slurry in a further step 8 at a temperature of 50-150° C., preferably at 70-110° C. Higher ageing temperatures operating at elevated pressure can also be used. The required ageing time will depend on a number of parameters as for example; quantity of sodium aluminate added, pH and temperature. Increase in pH and/or temperature will shorten the necessary ageing time, whereas an increase in alumina concentration will increase the ageing time.

When the silica is aged as described above we have found that it is possible to decrease the BET specific surface area substantially, without having much effect on the CTAB specific surface area. In this was it is possible to increase the CTAB/BET ratio to over 0.9.

It should be pointed out the BET specific surface area decreases in most of the steps prior to ageing, and even in the steps after ageing, while the decrease in the CTAB specific surface area is very low. It is however not possible to reach a CTAB/BET ratio higher than 0.9 without ageing at elevated temperature (50-100° C.).

Sulfuric acid and sodium hydroxide may be used for pH control, as well as other acids and bases. The choice of acid or base will depend on the type of impurity allowed in the product.

Ageing in step 8 can be carried out in stirred tank reactors, tubular reactors or other suitable reactors.

The alumina content may be further increased after ageing by addition of sodium aluminate and acid in an additional treatment step 9. The acid, preferably sulfuric acid is added for pH control. The pH after sodium aluminate (and acid) addition is preferably in the range 4-9 and more preferably in the range 6-7.

The silica slurry is subjected to deagglomeration, depending on the use, and/or product quality requirements. This can be accomplished in a dispersion step 10 after ageing to break up silica agglomerates. The silica can also be subjected to a deagglomeration step before ageing.

In the next step of the process, further mineral impurities are removed from the silica slurry by suitable separation means 11. This may be done by conventional degrifting methods, for example by letting the slurry sediment one or more times and separating the slurry from the sediment, centrifuges, or by using hydrocyclones of suitable dimensions. The pH of the substantially purified slurry may then optionally be adjusted to a desired pH value prior to drying.

In a final step 12, spray dryers are preferably used for drying to yield silica beads of 50-500 µm diameter. Many other dryer types of dryers can be used, as for example spin flash dryers, swirl fluidizers, or similar equipment, to yield silica powders. Such dried powders may subsequently be granulated.

The silica slurry may be dried with other conventional drying means well known in the art, and pulverized after drying if necessary. High silica content of the slurry will substantially save the time and/or energy required to dry the silica.

For some applications it is important to keep the water in the dried silica within certain limits. This applies for example to silica that is to be compounded into rubber formulations with a silane coupling agent. In this case the drying process will be adjusted so that the water content of the dried silica is in the range of about 5-10 wt %.

Several tests have been done with the process according to the invention.

EXAMPLE 1

The chemical composition of the olivine used (AFS 120 from A/S Olivin, Norway) is shown in Table 1 and the results of sieve analysis in Table 2.

TABLE 1

Chemical composition of olivine sample AFS 120 from Olivin A/S

| | Content (%) |
|---|---|
| MgO | 49.2 |
| $SiO_2$ | 42.1 |
| $Fe_2O_3$ | 7.3 |
| $Cr_2O_3$ | 0.49 |
| $Al_2O_3$ | 0.27 |
| NiO | 0.33 |
| MnO | 0.08 |
| CaO | 0.1 |
| L.O.I.* | 0.65 |
| $Na_2O$ | 0 |
| $K_2O$ | 0.01 |
| SUM | 100.53 |

*Loss on ignition

TABLE 2

Results of sieve analysis of olivine sample AFS 120

| Mesh | mm | % on sieve | cumultative % |
|---|---|---|---|
| 60 | 0.25 | 0 | 100.0 |
| 80 | 0.18 | 0.2 | 99.8 |
| 120 | 0.125 | 30.4 | 69.4 |
| 170 | 0.09 | 40.5 | 28.9 |
| 230 | 0.063 | 19.5 | 9.4 |
| PAN | <0.063 | 9.4 | 0.0 |

For olivine dissolution a 5 L wide neck round bottom reactor was used. 2367 g of 22.1% hydrochloric acid was poured into the reactor. The content of the reactor was stirred with a paddle stirrer (70 mm swept diameter) made of PTFE (Teflon®). The stirrer shaft (made of glass) was inclined and stirred at a speed of 730 rpm. The reactor was fitted with a water cooled reflux condenser. The reactor and its contents were heated on an oil bath set at 107° C. When the temperature of the acid reached 99° C. the temperature controller of the oil bath was set at 95° C. Slurry consisting of 73.5 wt % olivine in water was prepared from 800 g of olivine, by mixing olivine and water in a bottle and shaking by hand, immediately before the slurry is poured into the 100° C. acid. 54 g of water is then used to flush remaining olivine in the bottle into the reactor. The nominal concentration of the slurry is thus 70%. The nominal concentration of the acid after mixing is 20%. Immediately after mixing the temperature of the mixture fell to about 93-94° C., where after it rose to about 110° C. (the boiling point) in about 3 minutes. The mixture then boiled under reflux for about 10-12 minutes where after the temperature of the mixture started to fall. When the reactor was taken of the oil bath, 120 minutes after mixing, the temperature of the mixture has fallen to about 94° C. Two batches were prepared as described above. Small slurry samples (30-50 ml) were taken from each batch after heating. The small slurry samples were filtered hot and washed (under vacuum) with water in small Buchner funnels (11 cm diameter). The filter cakes from the small slurry samples were slurried in water (ca. 50 ml) with the aid of an ultrasonic horn. The slurry was then allowed to stand for a few minutes where after the slurry was decanted of the sediment, which consisted mainly of mineral impurities. The silica slurry was then filtered and dried and the BET and CTAB specific surface areas measured. The average BET surface area was found to be 236 m2/g and the average CTAB specific surface area 155 m2/g. Small slurry samples were also taken from each reactor and cooled to room temperature when the reactors were removed from the oil bath. The pH of the small cooled slurry samples was measured and found to be –0.4. The slurry from each batch was filtered hot under vacuum in two large (24 cm diameter) Buchner funnels, and then washed in the funnels with about 3 l of hot water.

Filter cakes from the above two batches were combined and kneaded by hand until thick paste was obtained. The thick paste obtained was then subjected to intense mechanical stirring by a dissolver type mixer. A thick slurry was obtained in this way with a pH of 5.1.

Sodium aluminate (48 g Al/l, 89 g Na/l) was then added to the slurry to decrease the viscosity of the slurry. The pH increased to 7.0 and the Al content to ca. 300 ppm (in silica) through the sodium aluminate addition. The solid content of the slurry so obtained was 20.8%.

The slurry (about 2 l) was then aged under stirring in the 5 l reactor for 140 minutes at 90° C. (Heating time from room temperature to 90° C. was about 50 minutes and cooling time from 90° C. to room temperature about 40 minutes).

Sodium aluminate and sulphuric acid (6 M) were then added simultaneously to the cooled slurry while keeping the pH at 6.5-6.6. The Al content of the silica after sodium aluminate addition was estimated to be about 3000 ppm. 1.96 l of the slurry was then pumped through an ultrasonic flow through cell in 13 minutes to deagglomerate the silica. The (The ultrasonic horn (600 W) was operated continuously at 80% power output). This was repeated two times. Some of the mineral impurities with larger grain size settled at fast rate to the bottom of the containers and were separated from the rest of the slurry by decantation. The pH after deagglomeration was found to be 6.2. The pH of the slurry was increased over a period of several hours to 6.5 by adding 3.4 ml of sodium aluminate solution. The slurry was then allowed to sediment in a 2.5 l beaker for 10 hours. 1.6 l of the degritted slurry (density 1.115 g/ml) was the suctioned off. The density of the remaining slurry (about 400 ml) was 1.146 g ml and its density was lowered to 1.135 with water addition. The sediment was then subjected to ultrasonic deagglomeration in two 250 ml beakers, where after it was allowed to sediment for 5 h and the slurry suctioned of the sediment. The degritted slurry fractions were combined and sieved through a 30 μm sieve with the help of ultrasound. The density of the slurry (total volume about 1.8 l) was found to be 1.12 g/ml and its pH=6.24.

The slurry was then spray dried in a Buchi laboratory spray drier. Different properties of the silica powder were then determined, see results in table 3.

TABLE 3

| Properties of silica powder from example 1 | |
|---|---|
| Impurities | |
| Na, % | 0.66 |
| Mg, % | 0.023 |
| Al, % | 0.32 |
| Ca, % | 0.0049 |
| Fe, % | 0.0075 |
| Cl, % | 0.0008 |
| S, % | 0.26 |
| Humidity (105° C.), % | 3.4 |
| pH, 10% slurry | 6.2 |
| BET specific surface area, m$^2$/g | 157 |
| Single point pore volume from nitrogen adsorption, ml/g | 0.7 |
| CTAB specific surface area, m$^2$/g | 147 |
| Data from mercury porosimetry | |
| Pore volume, mm$^3$/g | 2700 |
| $V_1$, volume of pores with diameter < 400 Å, mm$^3$/g | 500 |
| $V_2$, volume of pores with diameter 175-275 Å, mm$^3$/g | 200 |
| CTAB/BET | 0.93 |

The results of the specific surface area measurements show that the BET specific surface area has decreased from 236 m$^2$/g to 157 m$^2$/g, whereas the CTAB specific surface area only decreased from 155 m$^2$/g to 147 m$^2$/g, through the above processing steps. The largest part of the decrease in BET specific surface area was in the ageing step. The CTAB/BET specific surface area ratio has therefore increased from 0.66 to 0.95 through the above processing steps. The BET and CTAB specific surface areas of a commercial silica (Zeosil 1165 MP) were also measured with the same methods and the BET specific surface area was found to be 150 m$^2$/g and the CTAB specific surface area 143 m$^2$/g, and the CTAB/BET ratio for this silica is therefore 0.95.

The silica obtained was then tested in a typical rubber formulation used for the production of tires with low rolling resistance (green tires). The water content of the silica was 3.7%, which is to low for rubber formulations and it was therefore increased to 7% by letting the silica adsorb water from humid air. For comparison a commercial silica (Zeosil 1165 MP) was also tested with the same rubber formulation. The processing properties of the silica of present invention were found to be superior to the properties of the commercial silica. The mechanical properties (tensile properties, hardness etc.) of the rubber samples produced from the silica of the present invention were found to be equivalent to those of rubber samples produced from the commercial silica. The rolling resistance of rubber samples with the silica of the present invention were significantly lower than that of rubber samples produced from the commercial silica, whereas the wet traction properties were similar.

EXAMPLE 2

The method of the present invention has also been tested in pilot scale. For olivine dissolution, and silica precipitation, a 2500 l glass lined reactor, equipped with a paddle stirrer, operated at 120 rpm, was used. The reactor had a heating/cooling jacket, and it was heated by 6 bar steam. The olivine used was of same quality as used in Example 1. Slurry of olivine in water (70% olivine) was prepared in a stirred mixing tank situated above the reactor. Hydrochloric acid was fed to the reactor and the reactor was heated with steam. When the temperature of the acid in the reactor reached 82° C., the steam supply was cut off, and the heating jacket emptied. The temperature of the acid continued to rise until it levelled off at about 94-96° C. The olivine slurry was then added by opening a ball valve in the feeding tube from the mixing tank to the reactor. The feeding time for olivine was about 2-3 minutes. The temperature in the reactor fell several degrees after feeding the olivine slurry, whereafter it started to rise, as in Example 1. The reactor was fitted with a reflux condenser, situated above the reactor. The capacity of this condenser proved insufficient, which led to pressure build up in the reactor, and to temperatures higher than the boiling point of the acid at ambient pressure (about 110° C. in some cases up to 124° C.). In order to prevent too high temperature increase, the reactor was cooled for a short time with cold water at temperatures above 110° C. When the temperature started to decrease, the cooling water was turned off, and the heating/cooling jacket emptied. The temperature then dropped and levelled off at about 96-100° C. after 15-20 minutes. If the pH in the reactor was found to be above −0.3 some acid was added in order to avoid to high pH in the mixture, since a too high pH (pH>1-2) will result in precipitation of iron oxides (or hydroxides), which will have detrimental effect on the purity of the silica obtained. Two batches were treated in the reactor as described above, each made up from about 360 kg of olivine, 154 l of water, and about 1350 l of 22.1% hydrochloric acid. In the first batch the maximum temperature was 116° C., while in the second batch it was 123° C. Some extra acid (25 l of 22.1% acid) was added to the second batch in order to lower the pH. After about 2 h from mixing, in each test, the reactor was cooled to 60° C. in about 30-40 minutes, whereafter the reactor was emptied. The outlet tube from the reactor was first led to a 100 l tank which served as a first degritting step by removing most of the coarse grained undissolved minerals by settling. The overflow from the settling tank was led to a stirred slurry tank. The time for emptying the reactor was about 30-40 minutes. In the first batch the pH of a slurry sample was found to be −0.9 while in the second batch it was found to be 0.2. The hot slurry from each batch was filtered in a conventional filter press, and washed in the filter press with water, about 7000 l. The filter cake from each batch was then repulped in water and filtered and washed again. Three cake samples were taken from each batch and the pH measured (as described in Example 1), and also the chloride content was determined. The three cake samples from the first batch had a pH of 5-5.5, a chloride content of 2-3 ppm and a solid content of 27-30%. The three cake samples from the second batch had a pH of 4.3-4.9, were free from chlorides, and had a solid content of about 29%.

The filter cake (263 kg) from the first batch, and filter cake from the second batch (225 kg), were mixed with 190 kg of water in a 800 l tank equipped with a stirrer. 30 ml of 50% NaOH was added and pH was measured to be 5.3. Then sodium aluminate solution (119 g Al/l, 224 g $Na_2O$/l) was added until the pH 7. The slurry was then transferred to the reactor and aged under stirring at 90° C. for 3 h. The aged slurry was then cooled and transferred back to the 800 l tank. The pH was found to be 6.58 and the chloride content of the slurry 16 ppm. In order to adjust the Al content, 1.1 l of 6 M sulphuric acid and 3.25 l of sodium aluminate solution were added. The pH was then found to be 6.66 and the temperature of the slurry was found to be 20° C.

The silica slurry was then de-agglomerated using an in-line dispersion unit/pump, and then pumped to a second tank for degritting by sedimentation. The slurry settled for 2.5 hours. Part of the slurry (25 l) was then spray dried to give silica powder with the properties shown in table 4.

For comparison it can be mentioned that the BET specifics surface area of the silica before ageing was about 200 $m^2$/g and the CTAB specific surface area 144 $m^2$/g.

TABLE 4

Properties of silica powder from example 2

| Impurities | |
|---|---|
| Na, % | 0.53 |
| Mg, % | 0.030 |
| Al, % | 0.32 |
| Ca, % | 0.0032 |
| Fe, % | 0.17 |
| Cl⁻, % | 0.0142 |
| S, % | 0.17 |
| Humidity (105° C.), % | 7.4 |
| pH, 10% slurry | 6.7 |
| BET specific surface area, $m^2$/g | 160 |
| Single point pore volume from nitrogen adsorption, ml/g | |
| CTAB specific surface area, $m^2$/g | 139 |
| Particle size of agglomerates from spray drying, mean, μm | 139 |
| CTAB/BET | 0.88 |

A sample of the silica was tested by a tire producer. The results obtained by the tire producer show that the silica of the present invention satisfies all the criteria for silica used in tyres. A sample of the silica was also tested by an animal feed manufacturer, who found the silica to satisfy all their criteria for use of silica in animal feed.

EXAMPLES 3-6

In addition to the above examples 1 and 2, silica was produced according to the process (examples 3-6) to compare the contents of Mg and Ca with silica delivered by other commercial suppliers. The results, in the form of chemical analysis, are shown in the table below and further in the diagram in FIG. 2 enclosed herewith.

| Sample id | Mg % | Ca % | S % | Fe % | Al % | Na % |
|---|---|---|---|---|---|---|
| PPG Hisil DXR 115 | 0.0034 | 0.016 | 0.33 | 0.015 | 0.058 | 0.61 |
| Rhodia Zeosil 1165MP | 0.0054 | 0.050 | 0.29 | 0.020 | 0.28 | 0.67 |
| Grace KS 408 GR | 0.0088 | 0.021 | 0.18 | 0.023 | 0.13 | 0.41 |
| Degussa Ultrasil 7005P | 0.0068 | 0.032 | 0.35 | 0.021 | 0.077 | 0.53 |
| Example 3 | 0.041 | 0.0052 | <0.0015 | 0.027 | 0.0035 | <0.005 |
| Example 4 | 0.024 | 0.0028 | 0.18 | 0.059 | 0.34 | 0.56 |
| Example 5 | 0.030 | 0.0032 | 0.17 | 0.0017 | 0.32 | 0.66 |
| Example 6 | 0.023 | 0.0049 | 0.26 | 0.0075 | 0.32 | 0.66 |

Figure 2:
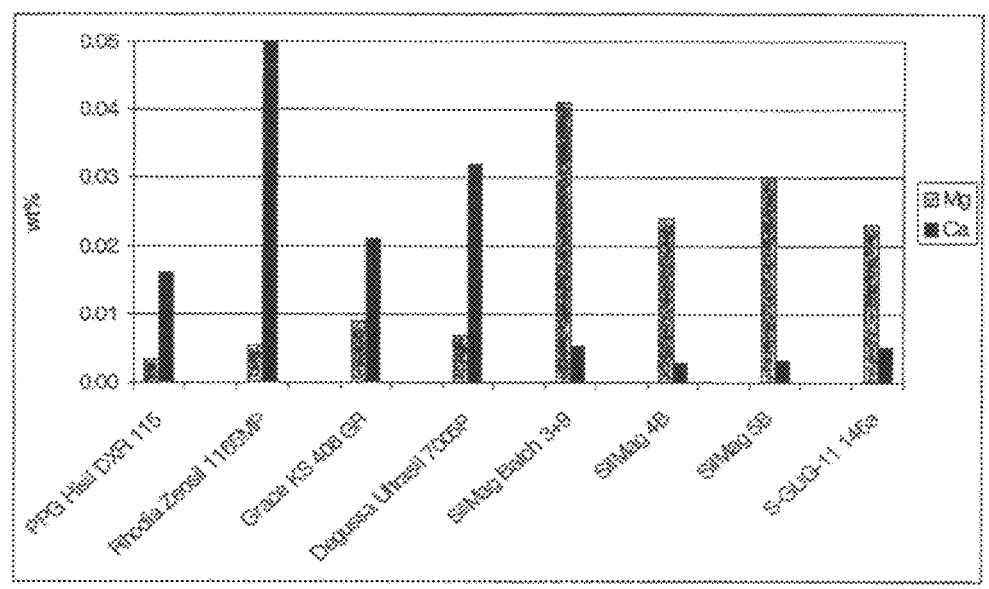
FIG. 2 shows diagram comparing the content of Ca and Mg in a silica product produced according to the invention compared with products produced by commercial suppliers.
Figure 3:
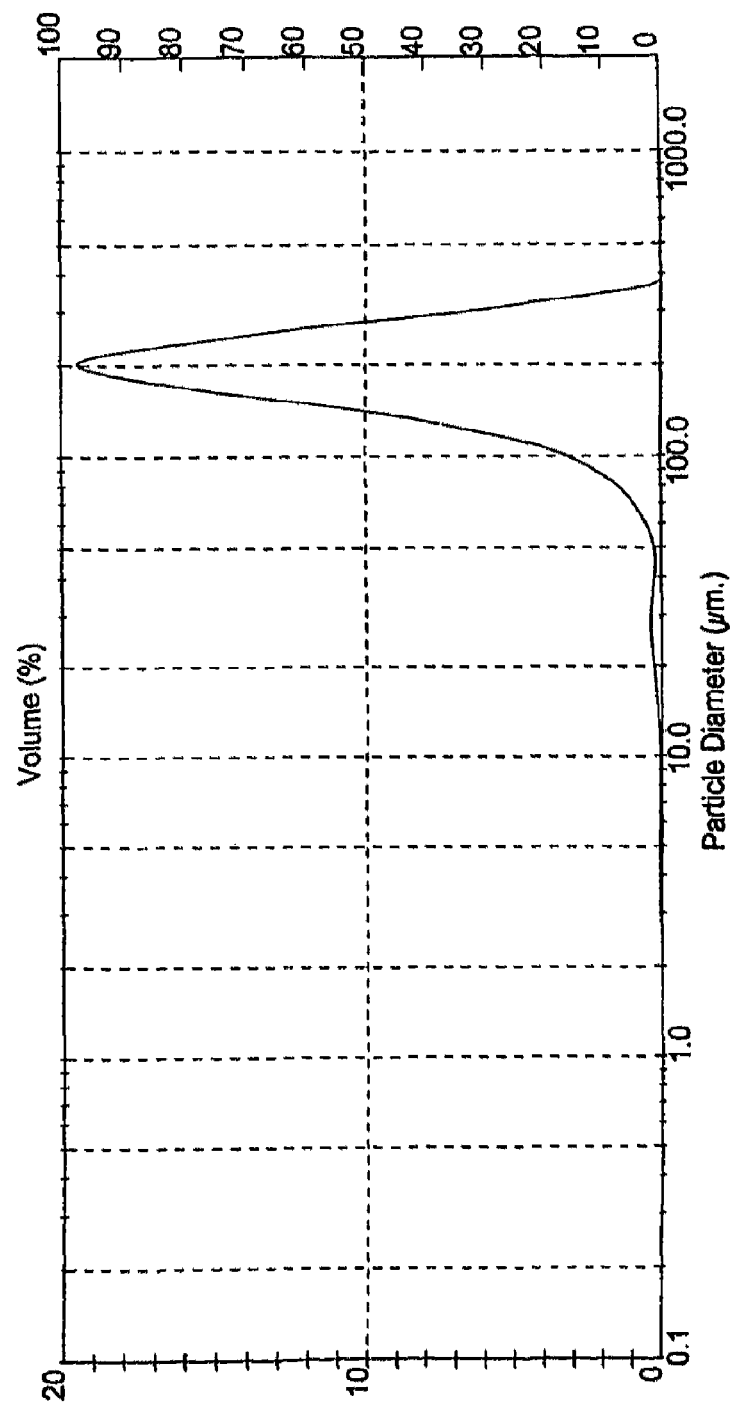
FIG. 3 depicts a diagram showing the particle size distribution of samples taken from a silica product produced according to the invention (based on Example 2).

As can be seen from the above table and FIG. 2, the content of Ca in the product from the present invention is down to one tenth compared to the commercial silicas, and the content of Mg is up to ten times higher. As can be further seen from example 3, by the process according to the present invention, virtually sulphur free silica can be produced. By the process according to the present invention a unique silica product is further obtained with a narrow particle distribution as is shown in FIG. 3. The curve revealed in FIG. 3 is drawn on the basis of analysis of samples from the silica product obtained under Example 2 above. A silica product with such narrow particle size distribution provides for instance improved easy handling and a good dispersability when used as filler.

The invention claimed is:

1. A process for the production of precipitated silica from olivine,
comprising the following steps:
providing olivine particles with a particle size below 1 mm in diameter,
mixing the olivine particles and water to form an olivine/water slurry,
mixing the olivine/water slurry with hydrochloric acid (HCl), at a concentration at 18 wt % or above, and at a temperature between 50-130°C, to form an olivine/acid slurry, and reacting the olivine/acid slurry for a period of time between 20-360 minutes to form a reacted mixture, wherein the reacted mixture contains coarse mineral impurities,
removing the coarse mineral impurities (sand product) from the reacted mixture to obtain a mother solution comprisingprecipitated silica,
separating the precipitated silica from the mother solution,
mechanically treating the separated precipitated silica and optionally some water to obtain a slurry,
preparing a low viscosity slurry by adding sodium aluminate or another aluminate, to 100-6000 p.p.m., and adjusting the pH to a value between 4-9,
ageing the low viscosity slurry at a temperature between 50-150°C. according to product requirements,
dispersing the aged silica slurry, wherein the slurry contains fine mineral impurities,
removing the fine mineral impurities (sand product) from the slurry to obtain a substantially purified slurry, and
drying the silica.

2. The process according to claim 1, wherein the mechanical treatment of the separated precipitated silica, with water addition, the preparation of the low viscosity slurry by adding sodium aluminate or another aluminate, to 100-6000 p.p.m., and the pH adjustment to a value between 4-9, are carried out in one step.

3. The process according to claim 1, wherein the particle size of the olivine is in the range of between 0.020 and 0.350 mm in diameter.

4. The process according to claim 1, wherein the temperature of the acid, when the mixing with the olivine/water slurry is started, is in the range of about 90-115°C.

5. The process according to claim 1, wherein the temperature of the olivine/acid slurry immediately after mixing olivine and acid is in the range of 90-110°C.

6. The process according to claim 1, wherein the time for mixing the olivine/water slurry and the acid is between 0.5 and 5 minutes, 7. The process according to claim 1, wherein the hydrochloric acid (HCl) concentration is 18% at the start of the mixing with the olivine/water slurry, and additional concentrated HCl is added during the reaction time.

8. The process according to claim 1, wherein the total reaction time is in the range of 60-150 minutes.

9. The process according to claim 1, wherein the removal of the coarse mineral impurities is accomplished by allowing the slurry to sediment in a sedimentation vessel.

10. The process according to claim 1, wherein the removal of the coarse particles is accomplished by means of hydrocyclone(s).

11. The process according to claim 1, wherein the precipitated silica is separated from the mother solution by filtration to form a filter cake, then washed with an aqueous washing liquid.

12. The process according to claim 11, wherein the content of solid material in the filter cake after filtration is in the range of about 10-30%.

13. The process according to claim 12, wherein content of the solid material in the filter cake after filtration is in the range of 18-22%.

14. The process according to claim 11, wherein the aqueous washing liquid is water.

15. The process according to claim 1, wherein the precipitated silica mechanically treated with a kneading device, to obtain a slurry with a high content of solid material.

16. The process according to claim 1, wherein the preparation of the low viscosity slurry is obtained by adding sodium aluminate, or another aluminate, to a concentration in the range of 300-3500 p.p.m., and
wherein sulfuric acid, and hydrochloric acid or another acid is added for pH adjustment, to obtain a pH in the range of 5-8.

17. The process according to claim 16, wherein the content of solid material in the low viscosity slurry is in the range of about 10-25%.

18. The process according to claim 17, wherein the content of solid material in the low viscosity slurry is in the range of 18-24%.

19. The process according to claim 1, wherein the CTAB/BET ratio is increased to above 0.9 by ageing the low viscosity slurry, in a stirred tank, at a temperature of between 80-100°C.

20. The process according to claim 1, wherein the pH of the low viscosity slurry is adjusted using NaOH or acid, and wherein the alumina content is further increased after ageing by addition of sodium aluminate, or another aluminate, and acid in an additional treatment step.

21. The process according to claim 1, wherein the pH of the substantially purified slurry is adjusted to a pH value in the range of 6.5 to 7.0, prior to drying.

* * * * *